US012292713B2

(12) United States Patent
Kajihara et al.

(10) Patent No.: US 12,292,713 B2
(45) Date of Patent: May 6, 2025

(54) TONER AND METHOD FOR PRODUCING THE SAME

(71) Applicant: CANON KABUSHIKI KAISHA, Tokyo (JP)

(72) Inventors: Hisasuke Kajihara, Ibaraki (JP); Yuya Chimoto, Chiba (JP); Junichi Tamura, Ibaraki (JP); Kazuhisa Shirayama, Tokyo (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 726 days.

(21) Appl. No.: 17/457,822

(22) Filed: Dec. 6, 2021

(65) Prior Publication Data

US 2022/0197163 A1 Jun. 23, 2022

(30) Foreign Application Priority Data

Dec. 17, 2020 (JP) ................................ 2020-209734

(51) Int. Cl.
*G03G 9/097* (2006.01)
*G03G 9/087* (2006.01)

(52) U.S. Cl.
CPC ................................ *G03G 9/08755* (2013.01)

(58) Field of Classification Search
CPC ........... G03G 9/08711; G03G 9/08755; G03G 9/09708
See application file for complete search history.

(56) References Cited

U.S. PATENT DOCUMENTS

| | | | |
|---|---|---|---|
| 7,833,687 | B2 | 11/2010 | Kato et al. |
| 8,697,327 | B2 | 4/2014 | Shibata et al. |
| 9,057,970 | B2 | 6/2015 | Ida et al. |
| 9,348,247 | B2 | 5/2016 | Ida et al. |
| 9,540,483 | B2 | 1/2017 | Ida et al. |

(Continued)

FOREIGN PATENT DOCUMENTS

| | | |
|---|---|---|
| CN | 104204960 A | 12/2014 |
| CN | 106154780 A | 11/2016 |

(Continued)

OTHER PUBLICATIONS

U.S. Appl. No. 17/457,766, Yuya Chimoto, filed Dec. 6, 2021.

(Continued)

*Primary Examiner* — Peter L Vajda
(74) *Attorney, Agent, or Firm* — VENABLE LLP

(57) ABSTRACT

To provide a toner having both low temperature fixability and hot offset resistance and having excellent scratch resistance of a fixed image. A toner including a toner particle containing a binder resin, a crystalline polyester, and a calcium carbonate particle, in which the crystalline polyester includes a unit derived from an aliphatic diol and a unit derived from an aliphatic dicarboxylic acid, an ester group concentration Ec of the crystalline polyester is 27% by mass or more to 50% by mass or less, a content Ma of the calcium carbonate particle included in the toner particle is 3% by mass or more to 40% by mass or less, and a ratio (Ma/Mc) of the content Ma of the calcium carbonate particle included in the toner particle to a content Mc (% by mass) of the crystalline polyester included in the toner particle is 0.2 or more to 20 or less.

14 Claims, 1 Drawing Sheet

(56) References Cited

U.S. PATENT DOCUMENTS

| | | | |
|---|---|---|---|
| 9,696,644 | B2 | 7/2017 | Ida et al. |
| 9,897,934 | B2 | 2/2018 | Tamura et al. |
| 9,915,884 | B2 | 3/2018 | Uchino |
| 10,012,920 | B2 | 7/2018 | Shibata et al. |
| 10,078,281 | B2 | 9/2018 | Ida et al. |
| 10,088,765 | B2 | 10/2018 | Miyakai et al. |
| 10,175,595 | B2 | 1/2019 | Onozaki et al. |
| 10,197,936 | B2 | 2/2019 | Onozaki et al. |
| 10,203,619 | B2 | 2/2019 | Yamashita et al. |
| 10,228,629 | B2 | 3/2019 | Tamura et al. |
| 10,353,312 | B2 | 7/2019 | Kamae et al. |
| 10,451,990 | B2 | 10/2019 | Kamae et al. |
| 10,514,624 | B2 | 12/2019 | Tamura et al. |
| 10,656,545 | B2 | 5/2020 | Kamae et al. |
| 10,775,710 | B1 | 9/2020 | Kamae et al. |
| 10,859,931 | B2 | 12/2020 | Hashimoto et al. |
| 10,877,386 | B2 | 12/2020 | Murayama et al. |
| 10,969,705 | B2 | 4/2021 | Shirayama et al. |
| 11,029,617 | B2 | 6/2021 | Chimoto et al. |
| 11,112,711 | B2 | 9/2021 | Ochi et al. |
| 11,131,938 | B2 | 9/2021 | Murayama et al. |
| 11,181,848 | B2 | 11/2021 | Ochi et al. |
| 2013/0108955 | A1 | 5/2013 | Shibata et al. |
| 2014/0363209 | A1 | 12/2014 | Inoue |
| 2015/0099227 | A1 | 4/2015 | Ida et al. |
| 2016/0334725 | A1 | 11/2016 | Katsumata et al. |
| 2019/0194446 | A1 | 6/2019 | Kurihara |
| 2020/0310273 | A1 | 10/2020 | Chimoto et al. |
| 2020/0409284 | A1 | 12/2020 | Matsubara et al. |
| 2020/0409285 | A1 | 12/2020 | Tokunaga et al. |
| 2021/0055668 | A1 | 2/2021 | Tamura et al. |
| 2021/0080848 | A1 | 3/2021 | Tsuchida et al. |
| 2021/0141315 | A1 | 5/2021 | Kamae et al. |
| 2021/0181647 | A1 | 6/2021 | Hashimoto et al. |
| 2021/0181649 | A1 | 6/2021 | Kanno et al. |
| 2021/0181650 | A1 | 6/2021 | Hama et al. |
| 2021/0181651 | A1 | 6/2021 | Kanno et al. |
| 2021/0278774 | A1 | 9/2021 | Hashimoto et al. |
| 2021/0278775 | A1 | 9/2021 | Kamae et al. |

FOREIGN PATENT DOCUMENTS

| | | | | | |
|---|---|---|---|---|---|
| JP | 2006-154157 | A | | 6/2006 | |
| JP | 2013-200559 | A | | 10/2013 | |
| JP | 2016-99517 | A | | 5/2016 | |
| JP | 2016-114828 | A | | 6/2016 | |
| JP | 2017-3901 | A | | 1/2017 | |
| JP | 2017-54001 | A | | 3/2017 | |
| JP | 2017-90489 | A | | 5/2017 | |
| JP | 2019-116562 | A | | 7/2019 | |
| WO | WO-2013-125450 | | * | 8/2013 | ............... G03G 9/08 |
| WO | WO-2013125450 | A1 | * | 8/2013 | ............... G03G 9/08 |

OTHER PUBLICATIONS

U.S. Appl. No. 17/536,853, Hisasuke Kajihara, filed Nov. 29, 2021.
U.S. Appl. No. 17/542,006, Masaharu Miura, filed Dec. 3, 2021.
U.S. Appl. No. 17/648,330, Hiroki Watanabe, filed Jan. 19, 2022.
U.S. Appl. No. 17/648,333, Ichiro Kanno, filed Jan. 19, 2022.
U.S. Appl. No. 17/648,368, Ichiro Kanno, filed Jan. 19, 2022.
U.S. Appl. No. 17/648,588, Daisuke Tsujimoto, filed Jan. 21, 2022.
U.S. Appl. No. 17/654,461, Yukihiro Abe, filed Mar. 11, 2022.
U.S. Appl. No. 17/654,481, Kazuki Murata, filed Mar. 11, 2022.
U.S. Appl. No. 17/656,282, Takeshi Hashimoto, filed Mar. 24, 2022.

* cited by examiner

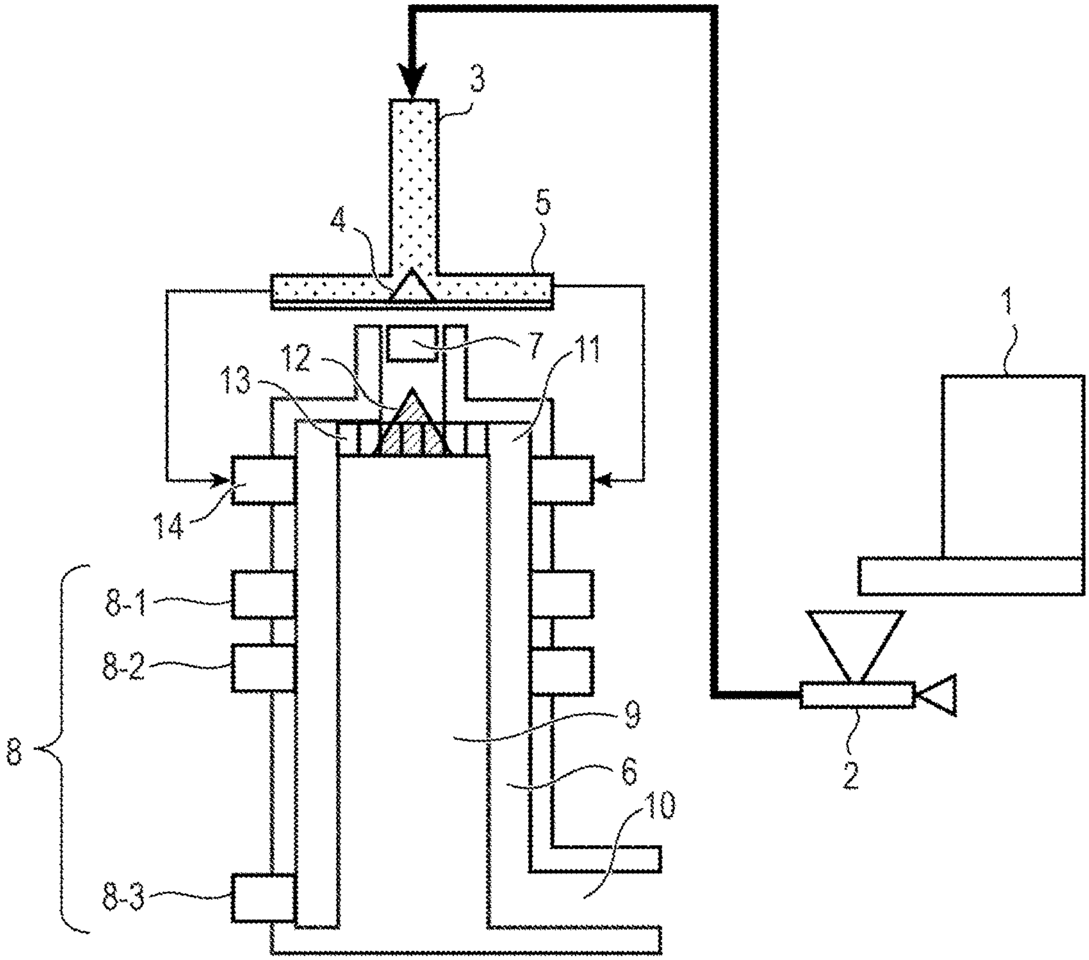
3
4
5
1
7
11
12
13
14
8-1
8-2
8
9
2
6
10
8-3

TONER AND METHOD FOR PRODUCING THE SAME

BACKGROUND OF THE INVENTION

Field of the Invention

The present invention relates to a toner used in an electrophotographic image forming method, and a method for producing the same.

Description of the Related Art

In recent years, there has been an increasing demand for higher printing speeds, and in order to meet this demand, the development of toners having excellent low temperature fixability has been advanced. In Japanese Patent Application Laid-Open No. 2017-90489, in order to realize a toner having excellent low temperature fixability, the development of a toner using a crystalline resin having excellent sharp meltability has been advanced. In addition, in Japanese Patent Application Laid-Open No. 2016-114828, the development of a toner containing a calcium carbonate particle has been advanced in order to improve the deterioration of transferability due to the use of a crystalline resin.

According to the studies by the inventors, it has been found that since the viscosity of the toner using a crystalline polyester as described in Japanese Patent Application Laid-Open No. 2017-90489 at a high temperature is lowered, the hot offset resistance is lowered.

In order to solve this problem, by adding an inorganic filler, such as calcium carbonate, as described in Japanese Patent Application Laid-Open No. 2016-114828, the viscosity of the toner is improved, and the hot offset resistance can be improved. However, the inventors have found that the effect on hot offset resistance is not sufficient depending on the kinds of crystalline polyester and inorganic filler. Further, the inventors have also found that the presence of the inorganic filler in the toner may lower the scratch resistance of the fixed image.

The present invention has been made in view of the above problems and is to provide a toner having both low temperature fixability and hot offset resistance, and having excellent scratch resistance of a fixed image.

SUMMARY OF THE INVENTION

As a result of diligent studies by the inventors, it has been found that the above-mentioned problems can be solved by allowing a crystalline polyester having a specific structure and calcium carbonate to be present in the toner particle at a specific quantitative ratio.

The crystalline polyester has a high ester group concentration Ec. The presence of the calcium carbonate particle in the toner particle allows the ester group of the crystalline polyester to interact with the calcium atom of the calcium carbonate. Due to the interaction, the filler effect is strongly exhibited and the cohesive force in the toner particle is improved. As a result, the hot offset resistance of the toner and the scratch resistance of the fixed object are improved. In addition, since the crystalline polyester has a flexible carbon skeleton by having a structure derived from an aliphatic diol and a structure derived from an aliphatic dicarboxylic acid as constituent units, the crystalline polyester easily comes into contact with the calcium carbonate particle, and the ester group and the calcium carbonate particle easily interact with each other.

The interaction between the ester group of the crystalline polyester and the calcium atom of the calcium carbonate is considered to be weakened since the number of points of interaction with the calcium atom decreases when the ester group concentration Ec of the crystalline polyester is excessively low. On the other hand, when the ester group concentration Ec of the crystalline polyester is excessively high, the chain length of the aliphatic group is inevitably shortened, and the molecular motility of the crystalline polyester is lowered. Thus, it is considered that the ester group is less likely to come into contact with the calcium atom to reduce the interaction. Therefore, it is considered that the effect of the present invention is exhibited when the toner particle includes a crystalline polyester with a specific ester group concentration Ec range, and calcium carbonate as defined in the present invention.

That is, a toner according to an aspect of the present invention is a toner including a toner particle containing a binder resin, a crystalline polyester, and a calcium carbonate particle, in which the crystalline polyester includes a unit derived from an aliphatic diol and a unit derived from an aliphatic dicarboxylic acid, an ester group concentration Ec of the crystalline polyester is 27% by mass or more to 50% by mass or less, when a content of the calcium carbonate particle included in the toner particle is represented by Ma (% by mass), and a content of the crystalline polyester included in the toner particle is represented by Mc (% by mass), the Ma is 3% by mass or more to 40% by mass or less, and a ratio (Ma/Mc) is 0.2 or more to 20 or less.

Further features of the present invention will become apparent from the following description of exemplary embodiments with reference to the attached drawings.

BRIEF DESCRIPTION OF THE DRAWINGS

FIGURE is a schematic view of an apparatus for heat-treating the surface of a toner particle.

DESCRIPTION OF THE EMBODIMENTS

Unless otherwise specified, the description of "XX to YY" representing a numerical range means a numerical range including a lower limit and an upper limit which are end points.

A toner according to the present invention includes a toner particle, and the toner particle includes a binder resin, a crystalline polyester, and calcium carbonate. Hereinafter, each component will be described.

<Binder Resin>

Known polymers can be used as the binder resin included in the toner particle, and specifically, for example, the following polymers can be used.

Examples of the polymers include monopolymers of styrenes and substituted styrenes, such as polystyrene, poly-p-chlorostyrene, and polyvinyltoluene; styrene-based copolymers such as styrene-p-chlorostyrene copolymer, styrene-vinyltoluene copolymer, styrene-vinylnaphthalene copolymer, styrene-acrylic acid ester copolymer, styrene-methacrylic acid ester copolymer, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, and styrene-acrylonitrile-indene copolymer; polyvinyl chloride, phenolic resin, natural resin-modified phenolic resin, natural resin-modified maleic acid resin, acrylic resin, methacrylic resin, polyvinyl acetate, silicone resin, polyester, polyurethane, polyamide, furan resin, epoxy resin, xylene resin, polyvinylbutyral, terpene resin, coumarone-indene resin, and petroleum resins. These resins may be used alone or in combination of two or more.

Among these, polyester having high compatibility with the crystalline polyester described later is preferable from the viewpoint of low temperature fixability.

The content of the binder resin included in the toner particle is preferably 40% by mass to 90% by mass and more preferably 50% by mass to 80% by mass.

<Crystalline Polyester>

The crystalline polyester included in the toner particle includes a unit derived from an aliphatic diol and a unit derived from an aliphatic dicarboxylic acid.

The crystalline polyester is preferably a condensation polymer of an alcohol containing an aliphatic diol having 2 or more to 15 or less carbon atoms and a carboxylic acid containing an aliphatic dicarboxylic acid having 3 or more to 17 or less carbon atoms.

The crystalline polyester is more preferably a condensation polymer of an alcohol containing an aliphatic diol having 4 or more to 12 or less carbon atoms in an amount of 80 mol % or more to 100 mol % or less (more preferably 85 mol % or more to 100 mol % or less) with respect to the total amount of alcohol constituting the crystalline polyester and a carboxylic acid containing an aliphatic dicarboxylic acid having 4 or more to 17 or less carbon atoms in an amount of 80 mol % or more to 100 mol % or less (more preferably 85 mol % or more to 100 mol % or less) with respect to the total amount of carboxylic acid constituting the crystalline polyester.

The aliphatic diol is preferably a linear aliphatic diol, and examples of the aliphatic diol include 1,4-butanediol, 1,5-pentanediol, 1,6-hexanediol, 1,7-heptanediol, 1,8-octanediol, 1,9-nonanediol, 1,10-decanediol, 1,12-dodecanediol, and their derivatives. The derivative is not particularly limited as long as a crystalline polyester can be obtained by polycondensation. For example, a derivative obtained by esterifying a diol can be mentioned.

The aliphatic dicarboxylic acid is preferably a linear aliphatic dicarboxylic acid, and examples of the aliphatic dicarboxylic acid include malonic acid, succinic acid, glutaric acid, adipic acid, pimeric acid, speric acid, glutaconic acid, azelaic acid, sebacic acid, hexadecanedioic acid, eicosanedioic acid, and their derivatives. The derivative is not particularly limited as long as a similar resin structure can be obtained by polycondensation. Examples include derivatives such as acid anhydrides of dicarboxylic acids, alkyl esters of dicarboxylic acids, and acid chlorides of dicarboxylic acids.

On the other hand, as the carboxylic acid, a carboxylic acid other than the aliphatic dicarboxylic acid can also be used in combination.

In the present invention, the ester group concentration Ec of the crystalline polyester refers to a value indicating a ratio of the mass of the ester group [—C(=O)O—] to the mass of 1 mol of the crystalline polyester, and is specifically a value represented by Equation (1).

$$\text{Ester group concentration Ec (\% by mass)}=[(N\times 44)/(1\times\text{number average molecular weight})]\times 100 \quad \text{Equation (1)}$$

Here, in Equation (1), N represents the average of the number of ester groups included in one molecule of the crystalline polyester, 44 represents the formula weight of the ester group [—C(=O)O—], and the number average molecular weight represents the number average molecular weight of the crystalline polyester.

The ester group concentration Ec of the crystalline polyester is 27% by mass or more to 50% by mass or less, and preferably 27% by mass or more to 40% by mass or less. Within the above range, the interaction with calcium carbonate, which will be described later, becomes appropriate, and the hot offset resistance of the toner is improved.

On the other hand, when the ratio of the mass of the ester group [—C(=O)O—] to the mass of 1 mol of the binder resin is an ester group concentration Ea of the binder resin, the ratio (Ea/Ec) of the ester group concentration Ea of the binder resin to the ester group concentration Ec of the crystalline polyester is preferably 0.5 or more to 0.7 or less. Within the above range, the low temperature fixability of the toner is improved. When the Ea/Ec is higher than 0.7, since the interaction between the binder resin and the calcium carbonate particle is excessively strong, the compatibility between the binder resin and the crystalline polyester is lowered and the low temperature fixability is lowered. When the Ea/Ec is less than 0.5, since the interaction between the crystalline polyester and the calcium carbonate particle is excessively strong, the compatibility between the crystalline polyester and the binder resin is lowered and the low temperature fixability is lowered.

The acid value of the crystalline polyester is preferably 0 mgKOH/g or more to 10 mgKOH/g or less from the viewpoint of low temperature fixability, and is more preferably 0 mgKOH/g or more to 5 mgKOH/g or less.

The content Mc (% by mass) of the crystalline polyester included in the toner particle is preferably 0.1% by mass or more to 5.0% by mass or less. When the content of the crystalline polyester is within the above range, the binder resin exhibits sufficient plasticity, and the crystalline polyester is easily finely dispersed in the toner particles, which further improves the low temperature fixability.

<Calcium Carbonate Particle>

The toner particle includes the calcium carbonate particle.

As the calcium carbonate particle, for example, light calcium carbonate and colloidal calcium carbonate can be used.

The content Ma of the calcium carbonate particle included in the toner particle is 3% by mass or more to 40% by mass or less, and preferably 10% by mass or more to 33% by mass or less. Within the above range, the interaction with the crystalline polyester becomes appropriate, the hot offset resistance of the toner is improved, and the scratch resistance of the fixed image is also improved.

The ratio (Ma/Mc) of the content Ma of the calcium carbonate particle included in the toner particle to the content Mc (% by mass) of the crystalline polyester included in the toner particle is 0.2 or more to 20 or less, preferably 1 or more to 10 or less, and more preferably 5 or more to 10 or less. Within the above range, the filler effect is efficiently exhibited and the hot offset resistance of the toner is improved.

In the cross section of the toner particle observed with a transmission electron microscope, the average value of the aspect ratio (major axis/minor axis) of the calcium carbonate particle is preferably 1.5 or more to 6.0 or less, more preferably 1.8 or more to 2.7 or less, and even more preferably 2.0 or more to 2.5 or less. Within the above range, the hot offset resistance and the low temperature fixability of the toner are improved. When the aspect ratio is less than 1.5, the specific surface area of the calcium carbonate particle is reduced, and the filler effect is reduced. Thus, the hot offset resistance is lowered. When the aspect ratio is more than 3.0, the filler effect is excessively exhibited, and thus the low temperature fixability is lowered.

In the cross section of the toner particle observed with a transmission electron microscope, the standard deviation of the aspect ratio of the calcium carbonate particle is preferably 1.3 or less and more preferably 1.0 or less. When the standard deviation of the aspect ratio is more than 1.3, it is considered that there is a distribution of a region in which the interaction between the crystalline polyester and the calcium carbonate particle is strong and a region in which the interaction is weak, and the hot offset resistance of the toner is lowered.

In the cross section of the toner particle observed with a transmission electron microscope, the number average particle diameter of the calcium carbonate particle is preferably 100 nm or more to 600 nm or less, and more preferably 300 nm or more to 400 nm or less. Within the above range, the interaction between the ester group of the crystalline polyester and the calcium carbonate particle is improved, and the scratch resistance of the fixed image is improved.

In contrast, when the number average particle diameter of the calcium carbonate particle is less than 100 nm, the interaction between the ester group of the crystalline polyester and the calcium carbonate particle is weak, and the scratch resistance of the fixed image is not improved. In addition, when the number average particle diameter of the calcium carbonate particle is more than 600 nm, the interaction between the ester group of the crystalline polyester and the calcium carbonate particle is great, and the dispersibility of the calcium carbonate particle in the binder resin is deteriorated. Thus, the scratch resistance of the fixed image is not improved.

An abundance A of calcium atoms measured by X-ray photoelectron spectroscopy using the toner as a sample is preferably 0 atomic % or more to 0.5 atomic % or less, and more preferably 0 atomic % or more to 0.3 atomic % or less. Within the above range, the interaction between the ester group of the crystalline polyester and the calcium carbonate particle is improved, the filler effect is efficiently exhibited, and the hot offset resistance of the toner and the scratch resistance of the fixed image are improved. When the abundance A is higher than the above range, in the toner layer formed on paper, a large number of calcium carbonate particles are present between the toner particles, that is, the dispersibility of the calcium carbonate particle is deteriorated to reduce the filler effect. Thus, the hot offset resistance is lowered. The abundance A of calcium atoms on the toner surface is controllable by hot air temperature in the hot air treatment step described later.

<Polymer a>

From the viewpoint of the hot offset resistance of the toner, the toner particle preferably includes a graft polymer a having a polyolefin as a trunk and a styrene acrylic resin as a branch. When the toner particle does not include the polymer a, the interaction between the calcium carbonate particle and the polymer a does not occur, and there is a risk that the dispersibility of the calcium carbonate particle in the binder resin may be deteriorated. In this case, since the filler effect is reduced, there is a risk that the hot offset resistance of the toner may be lowered.

The polyolefin is not particularly limited, and examples of the polyolefin include low molecular weight polyethylene, low molecular weight polypropylene, alkylene copolymer, microcrystalline wax, ester wax, paraffin wax, and Fischer-Tropsch wax. In addition, from the viewpoint of reactivity during production of the polymer a, the polymer preferably has a branched structure like polypropylene.

In the present invention, a method for grafting a styrene acrylic resin onto a hydrocarbon compound is not particularly limited, and a known method can be used. In the polymer a of the present invention, the styrene acrylic resin is more preferably has a structural site derived from a saturated alicyclic compound. For example, an aspect in which the styrene acrylic resin has a monomer unit represented by Formula (A) may be mentioned.

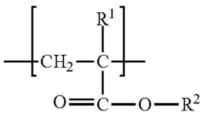

(A)

In Formula (A), $R^1$ represents a hydrogen atom or a methyl group, and $R^2$ represents a saturated alicyclic group.

As the saturated alicyclic group represented by $R^2$, a saturated alicyclic hydrocarbon group is preferable, a saturated alicyclic hydrocarbon group having 3 or more to 18 or less carbon atoms is more preferable, and a saturated alicyclic hydrocarbon group having 4 or more to 12 or less carbon atoms is even more preferable. The saturated alicyclic hydrocarbon group includes a cycloalkyl group, a condensed polycyclic hydrocarbon group, a cross-linked ring hydrocarbon group, a spirohydrocarbon group, and the like.

Examples of the saturated alicyclic group include a cyclopropyl group, a cyclobutyl group, a cyclopentyl group, a cyclohexyl group, a cycloheptyl group, a cyclooctyl group, a tricyclodecanyl group, a decahydro-2-naphthyl group, a tricyclo [5.2.1.02,6] decan-8-yl group, a pentacyclopentadecanyl group, a bicyclo [2.2.1] heptane-2-yl group, an adamantyl group, a dicyclopentanyl group, and a tricyclopentanyl group. In addition, the saturated alicyclic group may also have an alkyl group, a halogen atom, a carboxy group, a carbonyl group, a hydroxy group or the like as a substituent. As the alkyl group, an alkyl group having 1 to 4 carbon atoms is preferable.

Among these saturated alicyclic groups, a cycloalkyl group, a condensed polycyclic hydrocarbon group, and a cross-linked ring hydrocarbon group are preferable, a cycloalkyl group having 3 or more to 18 or less carbon atoms, a substituted or unsubstituted dicyclopentanyl group, a substituted or unsubstituted tricyclopentanyl group are more preferable, a cycloalkyl group having 4 or more to 12 or less carbon atoms is even more preferable, and a cycloalkyl group having 6 or more to 10 or less carbon atoms is particularly preferable.

In addition, the position and the number of the substituent are arbitrary, and when two or more substituents are present, the substituents may be the same as or different from each other.

The styrene acrylic resin may be a homopolymer of the vinyl-based monomer (a) having a structural site derived from a saturated alicyclic compound, or may be a copolymer with another monomer (b).

Examples of the vinyl-based monomer (a) having a structural site derived from a saturated alicyclic compound include monomers such as cyclopropyl acrylate, cyclobutyl acrylate, cyclopentyl acrylate, cyclohexyl acrylate, cycloheptyl acrylate, cyclooctyl acrylate, cyclopropyl methacrylate, cyclobutyl methacrylate, cyclopentyl methacrylate, cyclohexyl methacrylate, cycloheptyl methacrylate, cyclooctyl methacrylate, dihydrocyclopentadiethyl acrylate, dicyclopentanyl acrylate, dicyclopentanyl methacrylate, and the like, and a combination of these monomers. Among these, from the viewpoint of hydrophobicity, cyclohexyl acrylate, cycloheptyl acrylate, cyclooctyl acrylate, cyclohexyl methacrylate, cycloheptyl methacrylate, and cyclooctyl methacrylate are preferable.

Examples of the other monomer (b) include styrene-based monomers such as styrene, α-methylstyrene, p-methylstyrene, m-methylstyrene, p-methoxystyrene, p-hydroxystyrene, p-acetoxystyrene, vinyltoluene, ethylstyrene, phenylstyrene, and benzylstyrene; alkyl esters of unsaturated carboxylic acids such as methyl acrylate, ethyl acrylate, butyl acrylate, 2-ethylhexyl acrylate, methyl methacrylate, ethyl methacrylate, butyl methacrylate, and 2-ethylhexyl methacrylate, (the alkyls having 1 or more to 18 or less carbon atoms); vinyl ester-based monomers such as vinyl acetate; vinyl ether-based monomers such as vinyl methyl ether; halogen element-containing vinyl-based monomers such as vinyl chloride; olefin-based monomers such as butadiene, and isobutylene; and a combination of these monomers.

The ratio (Mo/Mc) of the content Mo (% by mass) of the polymer a included in the toner particle to the content Mc (% by mass) of the crystalline polyester included in the toner particle is preferably 0.3 or more to 25 or less, and more preferably 0.4 or more to 15 or less. The ratio (Mo/Ma) of the content Mo (% by mass) of the polymer a included in the toner particle to the content Ma (% by mass) of the calcium carbonate particle included in the toner particle is preferably 0.08 or more to 6 or less, and more preferably 0.1 or more to 4 or less. Within the above range, the interaction between the polymer a and the calcium carbonate particle is improved, and the scratch resistance of the fixed image is improved.

<Release Agent>

The toner particle may include a release agent. The release agent can be exemplified by the following: low molecular weight polyolefins such as polyethylene; silicones having a melting point; fatty acid amides such as oleic acid amide, erucic acid amide, ricinoleic acid amide, stearic acid amide; ester waxes such as stearyl stearate; plant-based waxes such as carnauba wax, rice wax, candelilla wax, Japan wax, and jojoba oil; animal waxes such as bees wax; mineral and petroleum waxes such as montan wax, ozokerite, ceresin, paraffin waxes, microcrystalline wax, Fischer-Tropsch waxes, and ester waxes; and modified products of the above materials.

The release agent may be used alone or as a mixture of two or more. The melting point of the release agent is preferably 150° C. or lower, more preferably 40° C. or higher to 130° C. or lower, and even more preferably 40° C. or higher to 110° C. or lower. The content of the release agent is preferably 1 part by mass or more to 30 parts by mass or less with respect to 100 parts by mass of the binder resin.

<Colorant>

The toner particle may include a colorant. Examples of the colorant include known organic pigments or oil dyes, carbon black, and magnetic substances.

Examples of cyan colorants include copper phthalocyanine compounds and their derivatives, anthraquinone compounds, and basic dye lake compounds. Specific examples of the cyan colorants include C.I. Pigment Blue 1, 7, 15, 15:1, 15:2, 15:3, 15:4, 60, 62, and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specific examples of the magenta colorants include C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254, and C.I. Pigment Violet 19.

Examples of yellow colorants include condensed azo compounds, isoindolinone compounds, anthraquinone compounds, azo metal complexes, methine compounds, and allylamide compounds.

Specific examples of the yellow colorants include C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, and 194.

Examples of black colorants include carbon black, magnetic substances, and toned in black using the abovementioned yellow, magenta and cyan colorants.

The colorant may be used alone or as a mixture of two or more. In addition, these colorants may also be used in a solid solution state. The colorant may be selected from the viewpoint of the hue angle, chroma, lightness, lightfastness, OHP transparency, and dispersibility in the toner particle. The content of the colorant is preferably 1 part by mass or more to 20 parts by mass or less with respect to 100 parts by mass of the binder resin.

<External Additive>

The toner may contain an inorganic fine particle as required. The inorganic fine particle may be internally added to the toner particle or may be mixed with the toner particle as an external additive.

When the inorganic fine particles are contained as the external additive, inorganic fine particles such as silica fine particles, titanium oxide fine particles, and aluminum oxide fine particles are preferable. It is preferable that the inorganic fine particle is hydrophobicized with a hydrophobic agent such as a silane compound, a silicone oil, or a mixture of these compounds. When the inorganic fine particle is used for improving the fluidity of the toner, the specific surface area is preferably 50 $m^2/g$ or more to 400 $m^2/g$ or less. On the other hand, when the inorganic fine particle is used for improving durability of the toner, the specific surface area is preferably 10 $m^2/g$ or more to 50 $m^2/g$ or less. In order to achieve both improvement in flowability and improvement in durability, inorganic fine particles having a specific surface area within the above-described range may be used in combination. When the inorganic fine particle is contained as an external additive, the amount of the inorganic fine particle is preferably 0.1 part by mass or more to 10.0 parts by mass or less with respect to 100 parts by mass of the toner particle. For the mixing of the toner particle with the inorganic fine particle, a known mixer such as a Henschel mixer may be used.

<Method for Producing Toner>

A method for producing the toner is not particularly limited, and a known method, for example, an emulsification aggregation method, a pulverization method, and a suspension polymerization method, can be used. Preferably, the method for producing the toner includes a step of melting and kneading a mixture including a binder resin, a crystalline polyester, a calcium carbonate particle, and a colorant to obtain a melt-kneaded product, and a step of pulverizing the melt-kneaded product to obtain a toner particle. By carrying out melting and kneading, the crystalline polyester and the calcium carbonate particle are dispersed in the binder resin, the interaction between the crystalline polyester and the calcium carbonate particle is improved, the filler effect is exhibited, and the hot offset resistance of the toner is improved.

Hereinafter, as an example, a production procedure of a toner including pulverized toner particles obtained by using a pulverization method will be described.

First, as the materials constituting the toner particle, for example, predetermined amounts of a binder resin, a crystalline polyester, a calcium carbonate particle, a pigment, and as required, other components such as a release agent and a charge control agent are weighed, blended, and mixed. Examples of mixing devices include a double cone mixer, a V-shaped mixer, a drum-shaped mixer, a super mixer, a Henschel mixer, a Nauta mixer, and a Mechano Hybrid.

Next, the mixed materials are melted and kneaded. In the melting and kneading step, a batch type kneader, such as a pressure kneader or a Banbury mixer, a continuous-type kneader, or the like can be used, and from the viewpoint of superiority of enabling continuous production, a single- or twin-screw extruder is preferable. The temperature in the melting and kneading is preferably about 100° C. to 200° C. Examples of the twin-screw extruder include a KTK-type twin-screw extruder (manufactured by Kobe Steel, Ltd.), a TEM-type twin-screw extruder (manufactured by Toshiba Machine Co., Ltd.), a PCM mixer (manufactured by Ikegai Corp.), a twin-screw extruder (manufactured by KCK Co., Ltd.), a Ko-kneader (manufactured by Buss Corp.), and a Kneadex (manufactured by Nippon Coke & Engineering Co., Ltd.). Further, a resin composition obtained by melting and kneading is rolled using twin rolls or the like, and is rapidly cooled with water or the like in a cooling step.

Then, the cooled product of the resin composition is pulverized into a desired particle diameter in a pulverization step. In the pulverization step, the cooled product of the resin composition is coarsely pulverized using a pulverizer, for example, a crusher, a hammer mill, or a feather mill, and then further finely pulverized with, for example, a Kryptron System (manufactured by Kawasaki Heavy Industries Ltd.), a Super Rotor (manufactured by Nisshin Engineering Inc.), a Turbo Mill (manufactured by Turbo Kogyo Co., Ltd.), or a fine pulverizer using an air jet system.

Subsequently, as required, the pulverized product is classified using a classifier or a sieving machine in the manner of an Elbow Jet employing an internal classification system (manufactured by Nittetsu Mining Co., Ltd.), a Turbo Plex employing a centrifugal force classification system (manufactured by Hosokawa Micron Corporation), a TSP Separator (manufactured by Hosokawa Micron Corporation) or a Faculty (manufactured by Hosokawa Micron Corporation) to obtain a pulverized toner particle as a classified product.

<Surface Treatment with Hot Air>

For the toner particle, the toner particle surface is desirably treated with hot air. By treating the surface of the toner particle with hot air, the shape of the obtained classified product can be adjusted and the surface treatment can be carried out. The temperature of the hot air is preferably 100° C. or higher to 450° C. or lower. Within the above range, the abundance A of calcium atoms on the surface of the toner is controllable to be within the above range.

FIGURE illustrates an example of a surface treatment apparatus. In FIGURE, a mixture quantitatively supplied by a raw material quantitative supply unit 1 is introduced to an introduction pipe 3 installed on the central axis of a treatment chamber 6 by a compressed gas adjusted by a compressed gas adjustment unit 2. The mixture that passes through the introduction pipe 3 is uniformly dispersed by a conical protruding member 4 provided in the central portion of the introduction pipe 3, is then introduced into supply pipes 5 extending in a radial manner in eight directions, and is then introduced into the treatment chamber 6 in which heat treatment is carried out from a powder particle supply port 14.

At this time, the flow of the mixture supplied to the treatment chamber 6 is regulated by a regulation unit 9 for regulating the flow of the mixture provided in the treatment chamber 6. Therefore, the mixture supplied to the treatment chamber 6 is heat-treated while swirling in the treatment chamber 6, and then cooled by cold air supplied from a cold air supply unit 8 (cold air supply unit 8-1, cold air supply unit 8-2, and cold air supply unit 8-3).

The hot air for heat-treating the supplied mixture is supplied from a hot air inlet portion 11 of a hot air supply unit 7, and is introduced into the treatment chamber 6 by being spirally swirled by a swirling member 13 for swirling the hot air. As the configuration, the swirling member 13 for swirling the hot air has a plurality of blades and can control the swirling of the hot air according to the number and the angle of the blades. At this time, the bias of the hot air to be swirled can be reduced by a substantially conical distribution member 12.

The temperature of the hot air supplied in the treatment chamber 6 in a hot air outlet portion 10 of the hot air supply unit 7 is preferably 100° C. or higher to 300° C. or lower. When the temperature of the hot air at the hot air outlet portion 10 of the hot air supply unit 7 is within the above range, the toner particle can be uniformly subjected to spheroidization treatment while the fusion and coalescence of the toner particle due to excessive heating of the mixture are prevented.

The toner particle obtained through the above step may be used for a toner as it is. As required, an external additive may be externally added to the surface of the toner particle to obtain a toner. As a method for the external addition treatment with the external additive, a method of blending predetermined amounts of a toner particle and various known external additives, and stirring and mixing the materials using a mixing device such as a double cone mixer, a V-shaped mixer, a drum-shaped mixer, a super mixer, a Henschel mixer, a Nauta mixer, a Mechano Hybrid (manufactured by Nippon Coke & Engineering Co., Ltd.), or a Nobilta (manufactured by Hosokawa Micron Corporation) as an external addition machine may be used.

The volume-based median diameter of the toner is preferably 3.0 μm or more to 30.0 μm or less and more preferably 4.0 μm or more to 20.0 μm or less.

Hereinafter, the method for measuring physical properties related to the present invention will be described.

[Measurement of Acid Value of Resin]

The acid value of the resin is the number of milligrams (mg) of potassium hydroxide required to neutralize an acid component, such as free fatty acid or resin acid, contained in 1 g of a sample. The acid value is measured in accordance with JIS K 0070-1992, and the specific procedures are as follows.

(1) Reagent Preparation 1.0 g of phenolphthalein is dissolved in 90 mL of ethanol (95% by volume), and ion exchange water is added to have a volume of 100 mL to obtain a phenolphthalein solution. 7 g of special grade potassium hydroxide is dissolved in 5 mL of water, and ethanol (95% by volume) is added to have a volume of 1 L. The resultant solution is put into an alkali-resistant container and left for 3 days so as not to touch carbonic acid gas, or the like, and then filtered to obtain a potassium hydroxide solution. The obtained potassium hydroxide solution is stored in an alkali-resistant container. The factor of the potassium hydroxide solution is determined by putting 25 mL of 0.1 mol/L hydrochloric acid into an Erlenmeyer flask, adding several drops of the phenolphthalein solution, titrating the solution with the potassium hydroxide solution, and calculating the factor from an amount of the potassium hydroxide solution required for neutralization. The above 0.1 mol/L hydrochloric acid is prepared in accordance with JIS K 8001-1998.

(2) Operation (A) Main Test 2.0 g of the pulverized sample is precisely weighed in a 200 mL Erlenmeyer flask, 100 mL of a mixed solution of toluene and ethanol (2:1) is added thereto, and the mixture is dissolved over 5 hours. Then, several drops of the phenolphthalein solution are added as an indicator and the obtained mixture is titrated with the potassium hydroxide solution. In addition, the end point of the titration is set as the time when the light red color of the indicator is continued for about 30 seconds.

(B) Blank Test

Titration is carried out in the same manner as in the above operation except that the sample is not used (that is, only a mixed solution of toluene and ethanol (2:1) is used).

(3) The acid value is calculated by substituting the obtained result into the following equation.

$$A=[(C-B)\times f\times 5.61]/2.0$$

In the equation, A represents the acid value of the resin (mgKOH/g), B represents the amount (mL) of the potassium hydroxide solution added in the blank test, C represents the amount (mL) of the potassium hydroxide solution added in the main test, and f represents the factor of the potassium hydroxide solution.

[Surface Composition Analysis by X-Ray Photoelectron Spectroscopic Analysis (ESCA)]

The abundance A of calcium atoms on the surface of the toner is calculated by carrying out surface composition analysis by X-ray photoelectron spectroscopic analysis (ESCA). The ESCA apparatus and the measurement conditions are as follows. Apparatus used: PHI 5000 VersaProbe II Scanning XPS Microprobe, manufactured by Physical Electronics Industries, INC. (PHI)

Measurement Conditions:

X-ray source: AlKα (100μ 25 W 15 KV)

Angle: 45°

Pass Energy: 58.70 eV

From the peak intensity of each element measured under the above conditions, the surface atomic concentration (atomic %) is calculated using the relative sensibility factor offered by PHI. The surface atomic concentration of calcium atoms is defined as the abundance A of calcium atoms.

As the elements to be measured, 5 kinds of elements of C, O, Si, Ti, and Ca are measured, and the ratio of calcium atoms of the 5 kinds of elements is calculated. For each atom, the peak intensities based on the orbits of C: 1s, O: 1s, Si: 2p, Ca: 2p, and Ti: 2p are referred to.

[Aspect Ratio of Calcium Carbonate Particle]

The evaluation of the cross section observation of the toner and the aspect ratio of the calcium carbonate particle can be carried out by observing the cross section as follows.

The toner particle cross section can be prepared by putting the toner particles into a carbon tape shape, sputtering PtPd for 60 seconds, and scraping off the excess material with argon ion beam irradiation. The cross-sectional image of the toner particle can be obtained by a reflective electron imaging method using a Hitachi ultra-high resolution field emission type scanning electron microscope S-4800 (manufactured by Hitachi High-Technologies Corp.). By observing the toner cross section, the calcium carbonate particle is obtained as a clear contrast. The particle in the cross-sectional image of the toner particle is identified using an energy dispersive X-ray spectroscopic analyzer (EDAX) or the like.

The aspect ratio of the calcium carbonate particle is defined by the major axis/minor axis of the calcium carbonate particle. The major axis of the calcium carbonate particle can be measured as the length in the longitudinal direction (length of the long side) when the calcium carbonate particle is regarded as a rectangular parallelepiped. In addition, the minor axis of the calcium carbonate particle can be measured as the length in the latitudinal direction (the length of the short side) when the calcium carbonate particle is regarded as a rectangular parallelepiped. The aspect ratio is measured for 100 calcium carbonate particles to obtain an average value and a standard deviation.

[Particle Diameter of Calcium Carbonate Particle]

The number average particle diameter of the calcium carbonate particles means the number average of the major axes of the calcium carbonate primary particles. The number average particle diameter of the calcium carbonate particles can be measured from the reflective electron image of the calcium carbonate particles obtained by imaging the toner particle cross section with the above-described S-4800. Specifically, the major axis is measured for 100 calcium carbonate particles to obtain an average value.

[Measurement Method of Content Mc of Crystalline Polyester and Ester Group Concentration Ec of Crystalline Polyester]

160 g of sucrose (manufactured by Kishida Chemical Co., Ltd.) is added to 100 mL of ion exchange water, dissolved with stirring in a hot water bath to prepare a sucrose concentrate. 31 g of the sucrose concentrate and 6 mL of Contaminon N (a 10% by mass aqueous solution of a pH 7 neutral detergent for washing precision measurement equipment, including a nonionic surfactant, an anionic surfactant and an organic builder, manufactured by Wako Pure Chemical Industries, Ltd.) are put into a centrifugation tube to prepare a dispersion. 1.0 g of toner is added to this dispersion, and clumps of the toner are broken up with a spatula or the like. Next, the centrifugation tube is shaken in a shaker. After being shaken, the solution is transferred to a glass tube (50 mL) for a swing rotor, and separated in a centrifuge at 3500 rpm for 30 minutes.

This operation serves to separate the toner particle from the detached external additives. It is confirmed by visual observation that the toner particle and the aqueous solution are thoroughly separated, and the toner particle is collected, filtered with a reduced pressure filter and then dried for at least 1 hour in a drier to obtain a toner particle from which the external additives are separated. The weight of the obtained toner particle is measured.

The binder resin and the polymer a are dissolved at 23° C. from the toner particle from which the external additives are separated by the above method with methyl ethyl ketone, and filtered to obtain filtrate 1 and residue 1.

After the residue 1 is dried, the crystalline polyester and the release agent are dissolved at 100° C. by heated methyl ethyl ketone and filtered to obtain filtrate 2 and residue 2. After the filtrate 2 is dried, the crystalline polyester is dissolved by chloroform and filtered to obtain filtrate 3 and residue 3. By concentrating and drying the filtrate 3, the content Mc of the crystalline polyester is measured as based on the weight of the toner particle.

The ester group concentration Ec of the obtained crystalline polyester can be measured using GPC and gas chromatography (GS/MS).

For example, the ester group concentration Ec of the crystalline polyester can be calculated from Equation (1).

$$\text{Ester group concentration Ec (\% by mass)}=[(N\times 44)/(1\times \text{number average molecular weight Mn})]\times 100 \quad \text{Equation (1)}$$

In Equation (1), N represents the average of the number of ester groups included in one molecule of the crystalline polyester, 44 represents the formula weight of the ester group, and the number average molecular weight Mn represents the number average molecular weight of the crystalline polyester.

The number average molecular weight Mn of the crystalline polyester can be calculated using a GPC measurement system, and for example, the number average molecular weight can be calculated by a method using the following apparatus. First, using a GPC measurement system (manufactured by Shimadzu Corporation) in which a column (trade name: PLgel 5 μm Guard 50×7.5 mm, manufactured by Agilent Technologies) is as a guard column, and two columns (trade name: PLgel Mixed C, manufactured by Agilent Technologies) are connected in series, standard polystyrenes (trade name: TSK standard polystyrenes F-850, F-450, F-288, F-128, F-80, F-40, F-20, F-10, F-4, F-2, F-1, A-5000, A-2500, A-1000, and A-500, all manufactured by Tosoh Corporation) are measured, and a calibration curve is created from the peaks detected by an RI detector to obtain a molecular weight distribution. Next, 50 mg of the obtained crystalline polyester is dissolved in 5 mL of chloroform, and left for about 5 hours to obtain a solution. The solution is filtered with a solvent-resistant membrane filter (trade name: Maishoridisk H-25-5, manufactured by Tosoh Corporation) having a pore diameter of 0.5 μm to obtain a sample solution. The obtained sample solution is measured under the same conditions as in the measurement of the standard polystyrenes, and the molecular weight corresponding to the obtained peak is obtained from the calibration curve to calculate the number average molecular weight Mn of the crystalline polyester.

The alcohol containing the aliphatic diol and the carboxylic acid containing the aliphatic dicarboxylic acid contained in the crystalline polyester can be identified by the following method using, for example, pyrolysis gas chromatography. About 200 μg of a crystalline polyester to which 1 μL of tetramethylammonium hydroxide is added as a pyrolysis aid is used as a sample. This sample is wrapped in Pyrofoil F590 and heated at 590° C. for 5 seconds using a thermal decomposition apparatus (for example, trade name: JPS-900, manufactured by Japan Analytical Industry Co., Ltd.) to decompose the crystalline polyester. The alcohol containing the aliphatic diol and the carboxylic acid containing the aliphatic dicarboxylic acid contained in the crystalline polyester, and the peak areas derived from the alcohol and the carboxylic acid are identified from a mass spectrum pattern obtained by analyzing the gas generated by the decomposition of the crystalline polyester using, for example, a precision mass spectrometer provided in a GC/MS measurement system (trade name: Accurate-Mass Q-TOF GC/MS7200, manufactured by Agilent Technologies) equipped with a column (trade name: HP-SMS, manufactured by Agilent Technologies) and a detector (trade name: JPS-900, manufactured by Japan Analytical Industry Co., Ltd.).

Next, the number of moles of monomers is obtained using the peak area and the calibration curve derived from each monomer obtained from the pyrolysis gas chromatography in which the calibration curve is created using the standard of the identified monomer. In this manner, the molar ratio of the alcohol containing the aliphatic diol and the carboxylic acid containing the aliphatic dicarboxylic acid constituting the crystalline polyester (a, b, . . . x, y, . . . in the following composition formula) is obtained.

$$\text{(Carboxylic acid A)}a\text{(carboxylic acid B)}b \ldots \text{(alcohol X)}x\text{(alcohol Y)}y \ldots$$

When the molecular weights of carboxylic acid A, carboxylic acid B, . . . are respectively $M_A$, $M_B$, . . . , and the molecular weights of alcohol X, alcohol Y, . . . are respectively $M_X$, $M_Y$, . . . , Equation (2) is established with the number average molecular weight Mn of the crystalline polyester. In Equation (2), n represents a positive number.

$$Mn=\{(M_A+M_B+ \ldots M_X+M_Y+ \ldots)-(a+b+ \ldots x+y+ \ldots -1)\times 18\}\times n \quad \text{Equation (2)}$$

From Equation (2), the numerical value of n is obtained, and the average N of the number of ester groups included in one molecule of the crystalline polyester can be obtained from Equation (3).

$$N=(a+b+ \ldots x+y+ \ldots -1)\times n \quad \text{Equation (3)}$$

By substituting the number average molecular weight Mn of the crystalline polyester obtained above and the average N of the number of ester groups included in one molecule of the crystalline polyester resin into Equation (1), the ester group concentration Ea can be obtained.

<Measurement Method of Ester Group Concentration Ea of Binder Resin>

After the filtrate 1 is dried, a binder resin (amorphous polyester) is dissolved with ethyl acetate to obtain filtrate 4 and residue 4. The filtrate 4 is concentrated and dried to obtain a binder resin. The ester group concentration Ea of the obtained binder resin can be measured using GPC and gas chromatography (GS/MS). The measurement of the ester group concentration Ea of the binder resin using GPC and gas chromatography (GS/MS) can be carried out in the same manner as in the measurement of the ester group concentration Ec of the crystalline polyester.

<Measurement Method of Content Ma of Calcium Carbonate>

By concentrating and drying the residue 2 after centrifuging the residue 2, the content Ma of the calcium carbonate is measured based on the weight of the toner particle.

<Measurement Method of Content Mo of Polymer a>

By drying the residue 4, the content Mo of the polymer a is measured based on the weight of the toner particle. The structure of the polymer a is measured using nuclear magnetic resonance spectroscopy (NMR) and infrared spectroscopy (IR).

Examples

Hereinafter, the present invention will be described in more detail with reference to Examples and Comparative Examples, but these are not intended to limit the present invention in any way. In the following examples, the number of parts is on a mass basis.

<Production Example of Binder Resin A1>

Fumaric acid: 54.3 parts

Propylene oxide adduct of bisphenol A (BPA-PO): 22.0 parts

Dipropanol: 23.8 parts

Tin 2-ethylhexanoate (esterification catalyst): 0.5 parts

The above materials were weighed in a reaction vessel equipped with a cooling tube, a stirrer, a nitrogen introduction tube, and a thermocouple.

The reaction vessel was purged with nitrogen gas, the temperature was gradually raised under stirring, and the reaction was allowed to proceed for 3 hours under stirring at a temperature of 140° C.

Next, the pressure in the reaction vessel was reduced to 8.3 kPa, the temperature was raised to a temperature of 200° C. under stirring, and the reaction was allowed to proceed for 4 hours (reaction step 1).

Thereafter, the pressure in the reaction vessel was reduced to 5 kPa or lower again, and the reaction was allowed to proceed for 3 hours at 200° C. to obtain binder resin A1 (reaction step 2).

<Production Examples of Binder Resins A2 to A11>

Binder resins A2 to A11 were obtained by carrying out the same operation as in the production example of the binder resin A1 except that the kinds of carboxylic acid and alcohol were changed as shown in Table 1.

TABLE 1

| Binder | Alcohol component | | Carboxylic acid component | |
|---|---|---|---|---|
| resin | Kind | Parts | Kind | Parts |
| A1 | BPA-EO (15%) | 22.0 | Fumaric acid | 54.3 |
| | Propanediol (85%) | 23.8 | | |
| A2 | BPA-PO (25%) | 29.0 | Terephthalic acid | 55.7 |
| | Propanediol (75%) | 15.3 | | |
| A3 | BPA-PO (5%) | 7.19 | Terephthalic acid | 68.9 |
| | Propanediol (95%) | 23.9 | | |
| A4 | BPA-PO (10%) | 16.7 | Fumaric acid | 56.9 |
| | Propanediol (90%) | 26.4 | | |
| A5 | BPA-PO (5%) | 9.66 | Fumaric acid | 65.7 |
| | Ethylene glycol (95%) | 24.6 | | |
| A6 | BPA-PO (50%) | 46.9 | Terephthalic acid | 44.9 |
| | Propanediol (50%) | 8.21 | | |
| A7 | BPA-PO (30%) | 39.3 | Fumaric acid | 44.6 |
| | Propanediol (70%) | 16.1 | | |
| A8 | BPA-PO (25%) | 34.6 | Fumaric acid | 47.1 |
| | Propanediol (75%) | 18.2 | | |
| A9 | BPA-EO (10%) | 16.6 | Fumaric acid | 61.5 |
| | Ethylene glycol (90%) | 21.9 | | |
| A10 | BPA-PO (60%) | 52.2 | Terephthalic acid | 41.7 |
| | Propanediol (40%) | 6.10 | | |
| A11 | BPA-PO (70%) | 18.0 | Terephthalic acid (67%) | 21.0 |
| | BPA-EO (30%) | 45.8 | Dodecenylsuccinic acid (15%) | 8.14 |
| | | | Trimellitic anhydride (18%) | 7.12 |

BPA-PO: Bisphenol A propylene oxide adduct
BPA-EO: Bisphenol A ethylene oxide adduct
* The numbers in parentheses for the alcohol component and the carboxylic acid component represent the molar ratio (%) in each component.

<Production Example of Crystalline Polyester C1>

Adipic acid: 40.9 parts (0.31 mol; 100.0 mol % of the total number of moles of alcohol)

1,5-Pentanediol: 59.1 parts (0.31 mol; 100.0 mol % of the total number of moles of carboxylic acid)

Tin 2-ethylhexanoate: 0.5 parts

The above materials were weighed in a reaction vessel equipped with a cooling tube, a stirrer, a nitrogen introduction tube, and a thermocouple.

The reaction vessel was purged with nitrogen gas, the temperature was gradually raised under stirring, and the reaction was allowed to proceed for 3 hours under stirring at a temperature of 140° C. Next, the pressure in the reaction vessel was reduced to 8.3 kPa, the temperature was raised to a temperature of 200° C. under stirring, and the reaction was allowed to proceed for 1 hour to obtain crystalline polyester C1. The ester group concentration Ec of the obtained crystalline polyester C1 was measured as described above. The result is shown in Table 2.

<Production Examples of Crystalline Polyesters C2 to C8>

Crystalline polyesters C2 to C8 were obtained by carrying out the same operation as in the production example of the crystalline polyester C1 except that the conditions were appropriately changed such that the kinds of the aliphatic dicarboxylic acid and the aliphatic diol were changed as shown in Table 2. The ester group concentration Ec of each of the obtained crystalline polyesters was measured as described above. The result is shown in Table 2.

TABLE 2

| Crystalline | Alcohol component | | Carboxylic acid component | | Ec [% by |
|---|---|---|---|---|---|
| polyester | Kind | Parts | Kind | Parts | mass] |
| C1 | 1,5-Pentanediol | 59.1 | Adipic acid | 40.9 | 34 |
| C2 | 1,10-Decanediol | 35.6 | Adipic acid | 64.4 | 27 |
| C3 | 1,5-Pentanediol | 32.5 | Succinic acid | 67.5 | 39 |
| C4 | 1,4-Butanediol | 52.0 | Succinic acid | 48.0 | 42 |
| C5 | 1,5-Pentanediol | 41.1 | Sebacic acid | 58.9 | 28 |
| C6 | 1,3-Propanediol | 32.7 | Malonic acid | 67.3 | 49 |
| C7 | Ethylene glycol | 28.0 | Malonic acid | 72.0 | 53 |
| C8 | 1,12-Dodecanediol | 45.6 | Sebacic acid | 54.4 | 22 |

<Production Example of Polymer a1>

In an autoclave reaction vessel equipped with a thermometer and a stirrer, 300.0 parts of xylene and 10.0 parts of polypropylene (melting point: 90° C.) were put, and sufficiently dissolved. The reaction vessel was purged with nitrogen gas, a mixed solution of 68.0 parts of styrene, 5.0 parts of methacrylic acid, 5.0 parts of methacrylic acid cyclohexyl, 12.0 parts of butyl acrylate, and 250.0 parts of xylene was added dropwise for 3 hours at 180° C. to conduct polymerization. Further, after holding the mixture at this temperature for 30 minutes, the solvent was removed to obtain polymer a1.

<Production Example of Toner 1>

Binder resin A1: 100 parts

Crystalline polyester C1: 2 parts

Calcium carbonate particle-1:15 parts (500 nm, aspect ratio: 3.0)

Fischer-Tropsch wax 1:6 parts (hydrocarbon wax, melting point: 90° C.)

Colorant 1 (C.I. Pigment Blue 15:3) 7 parts

Polymer a1: 20 parts

The above materials were mixed using a Henschel mixer (model: FM-75, manufactured by Mitsui Mine Co., Ltd.) at a rotation speed of 20 $s^{-1}$ and a rotation time of 5 min. Thereafter, the mixture was kneaded using a twin-screw kneader (model: PCM-30, manufactured by Ikegai Corp.) set to a temperature of 130° C. The obtained kneaded product was cooled and coarsely pulverized to 1 mm or less with a hammer mill to obtain a coarsely pulverized product. The obtained coarsely pulverized product was finely pulverized using a mechanical pulverizer (T-250 manufactured by Turbo Kogyo Co., Ltd.). Further, the coarsely pulverized product was subjected to classification using a Faculty F-300 (manufactured by Hosokawa Micron Corporation). For the operation conditions of the Faculty F-300, the classification rotor rotation speed was set to 130 $s^{-1}$, and the dispersion rotor rotation speed was set to 120 $s^{-1}$.

The particle subjected to classification was subjected to heat treatment by the surface treatment apparatus shown in FIGURE. For the operation conditions, the feed amount was set to 3 kg/hr, the hot air temperature was set to 130° C., the hot air flow rate was set to 6 $m^3$/min, the cold air temperature was set to −5° C., the cold air flow rate was set to 4 $m^3$/min, the blower air volume was set to 20 $m^3$/min, and the injection air flow rate was set to 1 $m^3$/min. By carrying out the heat treatment, toner particle 1 having an average circularity of 0.96 was obtained.

100 parts of the obtained toner particles, 1.0 part of hydrophobic silica fine particles (BET: 200 $m^2$/g) hydrophobicized with hexamethyldisilazane, and 1.0 part of titanium oxide fine particles (BET: 80 $m^2$/g) surface-treated with isobutyltrimethoxysilane were mixed using a Henschel mixer (model: FM-75, manufactured by Mitsui Miike Chemical Engineering Machinery, Co., Ltd.) at a rotation speed of 30 $s^{-1}$ and a rotation time of 10 min to obtain toner 1. The volume average particle diameter of the toner 1 was 6.5 μm.

<Production Examples of Toners 2 to 21>

Toners 2 to 21 were obtained in the same manner as in the production example of the toner 1 except that the binder resin, the crystalline polyester, the calcium carbonate particle, the polymer a, and the heat treatment temperature in the production example of the toner 1 were changed as shown in Table 3.

<Production Examples of Toners 22 and 24 to 41 and Comparative Toners 1 to 12>

Toners 22 and 24 to 41 and Comparative Toners 1 to 12 were obtained in the same manner as in the production example of the toner 1 except that the binder resin, the crystalline polyester, and the calcium carbonate particle in the production example of the toner 1 were changed as shown in Table 3, and heat treatment was not carried out.

<Production Example of Toner 23>

Toner 23 was prepared by carrying out an emulsification aggregation method on the toner particles.

Preparation of Dispersion (Binder Resin A8 Dispersion)

Regarding Binder resin A8, an ultrahigh speed stirrer T. K. Robomix (manufactured by PRIMIX Corporation) was operated at a composition ratio of 80% of ion exchange water and 20% of the binder resin in terms of concentration, respectively, with the pH being adjusted to 8.5 with ammonia, and under the conditions of a rotation rate of at 4000 rpm and a temperature of 100° C. by heating, and as a result, a binder resin A8 dispersion (solid content: 20%) was obtained.

(Crystalline Polyester C4 Dispersion)

Each of 80 parts of the crystalline polyester C4 and 720 parts of ion exchange water was put into a stainless steel beaker, and the mixture was heated to 100° C. When the crystalline polyester C4 was melted, stirring was carried out at 4000 rpm using an ultrahigh speed stirrer T.K. Robomix (manufactured by PRIMIX Corporation). Next, 1.0 part of an anionic surfactant (NEOGEN RK, manufactured by Daiichi Kogyo Seiyaku Co., Ltd.) was added dropwise, and then emulsification dispersion was carried out to obtain the crystalline polyester C4 dispersion (solid content: 10%).

(Calcium Carbonate Particle-1 Dispersion)

Calcium carbonate particle-1:200 parts

Anionic surfactant (NEOGEN RK, manufactured by Daiichi Kogyo Seiyaku Co., Ltd.): 10 parts Ion exchange water: 790 parts The above materials were mixed and stirred at 7000 rpm using an ultrahigh speed stirrer T. K. Robomix (manufactured by PRIMIX Corporation). Further, the mixture was dispersed at a pressure of 200 MPa using a high pressure impact disperser Nanomizer (manufactured by Yoshida Kikai Co., Ltd.) to prepare a calcium carbonate particle-1 dispersion (concentration: 20% by mass).

(Preparation of Colorant Dispersion)

Colorant 1: 100 parts

Anionic surfactant (NEOGEN RK, manufactured by Daiichi Kogyo Seiyaku Co., Ltd.): 10 parts Ion exchange water: 890 parts The above materials were mixed and stirred at 7000 rpm using an ultrahigh speed stirring apparatus T.K. Robomix (manufactured by PRIMIX Corporation). Further, the mixture was dispersed at a pressure of 200 MPa using a high pressure impact disperser Nanomizer (manufactured by Yoshida Kikai Co., Ltd.) to prepare a colorant 1 dispersion (concentration: 10% by mass).

(Preparation of Release Agent Dispersion)

Fischer-Tropsch wax 1: 200 parts

Anionic surfactant (NEOGEN RK, manufactured by Daiichi Kogyo Seiyaku Co., Ltd.): 10 parts Ion exchange water: 790 parts The above materials were put into a mixing vessel equipped with a stirrer, then heated to 90° C., and stirred under the conditions of a rotor rotation speed of 19000 rpm and a screen rotation speed of 19000 rpm at a shear stirring site with a rotor outer diameter of 3 cm and a clearance of 0.3 mm while being circulated to a CLEARMIX W-MOTION (manufactured by M Technique Co., Ltd.), and dispersion treatment was carried out for 60 minutes. Thereafter, cooling was carried out to 40° C. under the cooling treatment conditions of a rotor rotation speed of 1000 rpm, a screen rotation speed of 0 rpm, and a cooling rate of 10° C./min to obtain a release agent dispersion (concentration: 20% by mass).

(Production of Toner 23)

Binder resin A8 dispersion: 100 parts

Crystalline polyester C4 dispersion: 4 parts

Calcium carbonate particle-1 dispersion: 15 parts

Colorant dispersion: 14 parts

Release agent dispersion: 6 parts

Polyaluminum chloride: 0.2 parts

The above materials were put into a homogenizer (Ultra Turrax T50, manufactured by IKA) and dispersed to prepare slurry.

The slurry was put into a stirrer equipped with a mantle heater, and heated to 60° C. while adjusting the rotation speed of the stirrer to sufficiently stir the slurry. After holding the slurry at 60° C. for 15 minutes, while the temperature was raised at 0.05° C./min, the particle diameter of the particle generated by a Coulter Multisizer III (aperture diameter: 50 manufactured by Beckman Coulter, Inc.) was measured every 10 minutes, and when the volume average particle diameter was 6.5 the pH was adjusted to 9.0 using a 5% sodium hydroxide aqueous solution. Then, while the pH was adjusted to 9.0 at every 5° C., the temperature was raised to 96° C. at a temperature rising rate of 1° C./min, and the temperature was held at 96° C. As a result of observing the particle shape and surface properties with an optical microscope and a scanning electron microscope (FE-SEM) every 30 minutes, and when the average circularity reached 0.960, the temperature was lowered to 20° C. at 1° C./min to solidify the particle.

Thereafter, the reaction product was filtered, sufficiently washed with ion exchange water, and then dried using a vacuum dryer to obtain a toner particle.

100 parts of the obtained toner particle, 1.0 part of hydrophobic silica fine particles (BET: 200 $m^2$/g) hydrophobicized with hexamethyldisilazane, and 1.0 part of titanium oxide fine particles (BET: 80 $m^2$/g) surface-treated with isobutyltrimethoxysilane were mixed using a Henschel mixer (model: FM-75, manufactured by Mitsui Miike Chemical Engineering Machinery, Co., Ltd.) at a rotation speed of 30 $s^{-1}$ and a rotation time of 10 min to obtain toner 23. The volume average particle diameter of the toner particle in the toner 23 was 6.6 μm.

TABLE 3

| | Binder resin | | Crystalline polyester | | Calcium carbonate particle | | | Polymer a1 | Hot air treatment temperature |
|---|---|---|---|---|---|---|---|---|---|
| | Kind | Parts | Kind | Parts | Kind | Parts | Particle diameter [nm] | Parts | [° C.] |
| Toner 1 | A1 | 100 | C1 | 2 | 1 | 15 | 500 | 20 | 200 |
| Toner 2 | A1 | 100 | C1 | 2 | 1 | 15 | 500 | 1 | 200 |
| Toner 3 | A1 | 100 | C1 | 0.8 | 1 | 5 | 500 | 40 | 200 |
| Toner 4 | A1 | 100 | C1 | 1 | 1 | 8 | 500 | 30 | 200 |
| Toner 5 | A1 | 100 | C1 | 1.2 | 1 | 6 | 500 | 0.3 | 200 |
| Toner 6 | A1 | 100 | C1 | 4 | 1 | 3 | 500 | 0 | 200 |
| Toner 7 | A1 | 100 | C1 | 5 | 1 | 10 | 500 | 0 | 200 |
| Toner 8 | A1 | 100 | C1 | 5 | 1 | 20 | 500 | 0 | 200 |
| Toner 9 | A1 | 100 | C1 | 5 | 1 | 30 | 500 | 0 | 200 |
| Toner 10 | A1 | 100 | C1 | 2 | 1 | 15 | 500 | 0 | 200 |
| Toner 11 | A1 | 100 | C1 | 2 | 1 | 18 | 500 | 0 | 200 |
| Toner 12 | A1 | 100 | C1 | 2 | 1 | 22 | 500 | 0 | 200 |
| Toner 13 | A2 | 100 | C1 | 2 | 1 | 22 | 500 | 0 | 200 |
| Toner 14 | A3 | 100 | C1 | 2 | 1 | 22 | 500 | 0 | 200 |
| Toner 15 | A4 | 100 | C1 | 2 | 1 | 22 | 500 | 0 | 200 |
| Toner 16 | A5 | 100 | C1 | 2 | 1 | 22 | 500 | 0 | 200 |
| Toner 17 | A6 | 100 | C2 | 2 | 1 | 22 | 500 | 0 | 200 |
| Toner 18 | A7 | 100 | C3 | 2 | 1 | 22 | 500 | 0 | 200 |
| Toner 19 | A8 | 100 | C4 | 2 | 1 | 22 | 500 | 0 | 200 |
| Toner 20 | A8 | 100 | C4 | 2 | 1 | 22 | 500 | 0 | 440 |
| Toner 21 | A8 | 100 | C4 | 2 | 1 | 22 | 500 | 0 | 460 |
| Toner 22 | A8 | 100 | C4 | 2 | 1 | 22 | 500 | 0 | — |
| Toner 23 | A8 | 100 | C4 | 2 | 1 | 22 | 500 | 0 | — |
| Toner 24 | A8 | 100 | C4 | 0.5 | 1 | 9 | 500 | 0 | — |
| Toner 25 | A8 | 100 | C4 | 4 | 1 | 3.5 | 500 | 0 | — |
| Toner 26 | A8 | 100 | C4 | 6 | 1 | 5 | 500 | 0 | — |
| Toner 27 | A8 | 100 | C4 | 6 | 1 | 5 | 500 | 0 | — |
| Toner 28 | A8 | 100 | C4 | 6 | 1 | 5 | 500 | 0 | — |
| Toner 29 | A8 | 100 | C4 | 6 | 2 | 5 | 100 | 0 | — |
| Toner 30 | A8 | 100 | C4 | 6 | 3 | 5 | 200 | 0 | — |
| Toner 31 | A8 | 100 | C4 | 6 | 4 | 5 | 620 | 0 | — |
| Toner 32 | A8 | 100 | C4 | 6 | 5 | 5 | 700 | 0 | — |
| Toner 33 | A8 | 100 | C4 | 6 | 6 | 5 | 120 | 0 | — |
| Toner 34 | A8 | 100 | C4 | 6 | 7 | 5 | 150 | 0 | — |
| Toner 35 | A8 | 100 | C4 | 6 | 8 | 5 | 200 | 0 | — |
| Toner 36 | A8 | 100 | C4 | 6 | 9 | 5 | 230 | 0 | — |
| Toner 37 | A8 | 100 | C4 | 20 | 6 | 5 | 120 | 0 | — |
| Toner 38 | A8 | 100 | C4 | 0.3 | 6 | 5 | 120 | 0 | — |
| Toner 39 | A8 | 100 | C4 | 2 | 6 | 39 | 120 | 0 | — |
| Toner 40 | A6 | 100 | C5 | 2 | 6 | 39 | 120 | 0 | — |
| Toner 41 | A4 | 100 | C6 | 2 | 6 | 39 | 120 | 0 | — |
| Comparative Toner 1 | A9 | 100 | C7 | 2 | 6 | 39 | 120 | 0 | — |
| Comparative Toner 2 | A8 | 100 | C4 | 50 | 6 | 7 | 120 | 0 | — |
| Comparative Toner 3 | A8 | 100 | C4 | 0.33 | 6 | 7 | 120 | 0 | — |
| Comparative Toner 4 | A8 | 100 | C4 | 25 | 6 | 2 | 120 | 0 | — |
| Comparative Toner 5 | A8 | 100 | C4 | 0.4 | 6 | 41 | 120 | 0 | — |
| Comparative Toner 6 | A10 | 100 | C8 | 2 | 6 | 39 | 120 | 0 | — |
| Comparative Toner 7 | A10 | 100 | C8 | 25 | 6 | 0 | 120 | 0 | — |
| Comparative Toner 8 | — | 0 | C8 | 25 | 6 | 2 | 120 | 0 | — |
| Comparative Toner 9 | — | 0 | C8 | 25 | 6 | 0 | 120 | 0 | — |
| Comparative Toner 10 | A10 | 100 | — | 0 | 6 | 2 | 120 | 0 | — |
| Comparative Toner 11 | A10 | 100 | — | 0 | 6 | 0 | 120 | 0 | — |
| Comparative Toner 12 | A11 | 100 | C8 | 3 | 10 | 28.6 | 110 | 0 | — |

The analysis result of the toner is shown in Table 4.

TABLE 4

| | Ester group concentration Ea of binder resin (% by mass) | Crystalline polyester: Content Mc in toner particle (% by mass) | Crystalline polyester: Ester group concentration Ec (% by mass) | Crystalline polyester: Acid value (mgKOH/g) | Ea/Ec | Calcium carbonate particle: Content Ma in toner particle (% by mass) | Calcium carbonate particle: Aspect ratio | Calcium carbonate particle: Abundance of calcium atoms on toner surface [%] | Polymer a1: Mo/Mc | Polymer a1: Mo/Ma | Volume average particle diameter of toner particle (mm) |
|---|---|---|---|---|---|---|---|---|---|---|---|
| Toner 1 | 20 | 2.0 | 34 | 3 | 0.6 | 15 | 2.3 | 0.2 | 10 | 1.3 | 6.5 |
| Toner 2 | 20 | 2.0 | 34 | 3 | 0.6 | 15 | 2.3 | 0.2 | 0.50 | 0.067 | 6.5 |
| Toner 3 | 20 | 0.80 | 34 | 3 | 0.6 | 5 | 2.3 | 0.2 | 50 | 8.0 | 6.4 |
| Toner 4 | 20 | 1.0 | 34 | 3 | 0.6 | 8 | 2.3 | 0.2 | 30 | 3.8 | 6.5 |
| Toner 5 | 20 | 1.2 | 34 | 3 | 0.6 | 6 | 2.3 | 0.2 | 0.25 | 0.050 | 6.5 |
| Toner 6 | 20 | 4.0 | 34 | 3 | 0.6 | 3 | 2.3 | 0.2 | 0 | 0 | 6.5 |
| Toner 7 | 20 | 5.0 | 34 | 3 | 0.6 | 10 | 2.3 | 0.2 | 0 | 0 | 6.6 |
| Toner 8 | 20 | 5.0 | 34 | 3 | 0.6 | 20 | 2.3 | 0.2 | 0 | 0 | 6.4 |
| Toner 9 | 20 | 5.0 | 34 | 3 | 0.6 | 30 | 2.3 | 0.2 | 0 | 0 | 6.5 |
| Toner 10 | 20 | 2.0 | 34 | 3 | 0.6 | 15 | 2.3 | 0.2 | 0 | 0 | 6.5 |
| Toner 11 | 20 | 2.0 | 34 | 3 | 0.6 | 18 | 2.3 | 0.2 | 0 | 0 | 6.5 |
| Toner 12 | 20 | 2.0 | 34 | 3 | 0.6 | 22 | 2.3 | 0.2 | 0 | 0 | 6.5 |
| Toner 13 | 15 | 2.0 | 34 | 3 | 0.45 | 22 | 2.3 | 0.2 | 0 | 0 | 6.5 |
| Toner 14 | 19 | 2.0 | 34 | 3 | 0.55 | 22 | 2.3 | 0.2 | 0 | 0 | 6.6 |
| Toner 15 | 22 | 2.0 | 34 | 3 | 0.65 | 22 | 2.3 | 0.2 | 0 | 0 | 6.6 |
| Toner 16 | 26 | 2.0 | 34 | 3 | 0.75 | 22 | 2.3 | 0.2 | 0 | 0 | 6.5 |
| Toner 17 | 13 | 2.0 | 27 | 3 | 0.45 | 22 | 2.3 | 0.2 | 0 | 0 | 6.5 |
| Toner 18 | 18 | 2.0 | 39 | 3 | 0.45 | 22 | 2.3 | 0.2 | 0 | 0 | 6.5 |
| Toner 19 | 18 | 2.0 | 41 | 3 | 0.45 | 22 | 2.3 | 0.2 | 0 | 0 | 6.5 |
| Toner 20 | 18 | 2.0 | 41 | 3 | 0.45 | 22 | 2.3 | 0.4 | 0 | 0 | 6.5 |
| Toner 21 | 18 | 2.0 | 41 | 3 | 0.45 | 22 | 2.3 | 0.6 | 0 | 0 | 6.5 |
| Toner 22 | 18 | 2.0 | 41 | 3 | 0.45 | 22 | 2.3 | 0.8 | 0 | 0 | 6.5 |
| Toner 23 | 18 | 2.0 | 41 | 3 | 0.45 | 22 | 2.3 | 1.0 | 0 | 0 | 6.6 |
| Toner 24 | 18 | 0.5 | 41 | 3 | 0.45 | 9 | 2.3 | 0.6 | 0 | 0 | 6.5 |
| Toner 25 | 18 | 4.0 | 41 | 3 | 0.45 | 3.5 | 2.3 | 0.6 | 0 | 0 | 6.4 |
| Toner 26 | 18 | 6.0 | 41 | 3 | 0.45 | 5 | 2.3 | 0.6 | 0 | 0 | 6.5 |
| Toner 27 | 18 | 6.0 | 41 | 9 | 0.45 | 5 | 2.3 | 0.6 | 0 | 0 | 6.5 |
| Toner 28 | 18 | 6.0 | 41 | 11 | 0.45 | 5 | 2.3 | 0.6 | 0 | 0 | 6.5 |
| Toner 29 | 18 | 6.0 | 41 | 11 | 0.45 | 5 | 2.3 | 0.6 | 0 | 0 | 6.4 |
| Toner 30 | 18 | 6.0 | 41 | 11 | 0.45 | 5 | 2.3 | 0.6 | 0 | 0 | 6.5 |
| Toner 31 | 18 | 6.0 | 41 | 11 | 0.45 | 5 | 2.3 | 0.6 | 0 | 0 | 6.5 |
| Toner 32 | 18 | 6.0 | 41 | 11 | 0.45 | 5 | 2.3 | 0.6 | 0 | 0 | 6.5 |
| Toner 33 | 18 | 6.0 | 41 | 11 | 0.45 | 5 | 1.4 | 0.6 | 0 | 0 | 6.5 |
| Toner 34 | 18 | 6.0 | 41 | 11 | 0.45 | 5 | 1.6 | 0.6 | 0 | 0 | 6.5 |
| Toner 35 | 18 | 6.0 | 41 | 11 | 0.45 | 5 | 2.9 | 0.6 | 0 | 0 | 6.5 |
| Toner 36 | 18 | 6.0 | 41 | 11 | 0.45 | 5 | 3.1 | 0.6 | 0 | 0 | 6.5 |
| Toner 37 | 18 | 20 | 41 | 11 | 0.45 | 5 | 1.4 | 0.6 | 0 | 0 | 6.5 |
| Toner 38 | 18 | 0.30 | 41 | 11 | 0.45 | 5 | 1.4 | 0.6 | 0 | 0 | 6.5 |
| Toner 39 | 18 | 2.0 | 41 | 11 | 0.45 | 39 | 1.4 | 0.6 | 0 | 0 | 6.5 |
| Toner 40 | 13 | 2.0 | 28 | 11 | 0.45 | 39 | 1.4 | 0.6 | 0 | 0 | 6.6 |
| Toner 41 | 22 | 2.0 | 49 | 11 | 0.45 | 39 | 1.4 | 0.6 | 0 | 0 | 6.5 |
| Comparative Toner 1 | 23 | 2.0 | 51 | 11 | 0.45 | 39 | 1.4 | 0.6 | 0 | 0 | 6.5 |
| Comparative Toner 2 | 18 | 50 | 41 | 11 | 0.45 | 7 | 1.4 | 0.6 | 0 | 0 | 6.5 |
| Comparative Toner 3 | 18 | 0.33 | 41 | 11 | 0.45 | 7 | 1.4 | 0.6 | 0 | 0 | 6.5 |
| Comparative Toner 4 | 18 | 25 | 41 | 11 | 0.45 | 2 | 1.4 | 0.6 | 0 | 0 | 6.4 |
| Comparative Toner 5 | 18 | 0.4 | 41 | 11 | 0.45 | 41 | 1.4 | 0.6 | 0 | 0 | 6.5 |
| Comparative Toner 6 | 12 | 2.0 | 26 | 11 | 0.45 | 39 | 1.4 | 0.6 | 0 | 0 | 6.5 |
| Comparative Toner 7 | 12 | 25 | 26 | 11 | 0.45 | 0 | 1.4 | 0.6 | 0 | 0 | 6.6 |
| Comparative Toner 8 | 0 | 25 | 26 | 11 | 0 | 2 | 1.4 | 0.6 | 0 | 0 | 6.5 |
| Comparative Toner 9 | 0 | 25 | 26 | 11 | 0 | 0 | 1.4 | 0.6 | 0 | 0 | 6.5 |
| Comparative Toner 10 | 12 | 0 | 0 | 11 | — | 2 | 1.4 | 0.6 | 0 | 0 | 6.4 |
| Comparative Toner 11 | 12 | 25 | 0 | 11 | — | 0 | 1.4 | 0.6 | 0 | 0 | 6.5 |
| Comparative Toner 12 | 22 | 3.0 | 26 | 5 | 0.85 | 28.6 | 1.5 | 0.2 | 0 | 0 | 6.5 |

The following evaluation tests were carried out using each toner.

<Production Example of Magnetic Core Particle 1>

Step 1 (Weighing and Mixing Step)

$Fe_2O_3$: 62.7 parts
$MnCO_3$: 29.5 parts
$Mg(OH)_2$: 6.8 parts
$SrCO_3$: 1.0 part The above materials were weighed, pulverized and mixed for 5 hours with a dry vibration mill using stainless beads with a diameter of ⅛ inch to obtain a pulverized mixture.

Step 2 (Prefiring Step)

The obtained pulverized mixture was prepared as a pellet having a size of about 1 mm by 1 mm using a roller compactor. The coarse powder was removed from the pellet with a vibration sieve having an opening of 3 mm, and subsequently, the fine powder was removed with a vibration sieve having an opening of 0.5 mm. The product was fired under a nitrogen atmosphere (oxygen concentration: 0.01% by volume) using a burner type firing furnace at a temperature of 1000° C. for 4 hours to prepare a calcined ferrite.

The composition of the obtained calcined ferrite is as follows.

$$(MnO)_{0.257}(MgO)_{0.117}(SrO)_{0.007}(Fe_2O_3)_{0.393}$$

Step 3 (Pulverization Step)

After pulverizing the obtained calcined ferrite to about 0.3 mm with a crusher, 30 parts of water was added to 100 parts of the calcined ferrite and pulverized with a wet ball mill using ⅛-inch diameter zirconia beads for 1 hour. The obtained slurry was pulverized with a wet ball mill using alumina beads having a diameter of 1/16 inch for 4 hours to obtain ferrite slurry (finely pulverized product of calcined ferrite).

Step 4 (Granulation Step)

To the ferrite slurry, 1.0 part of ammonium polycarboxylate as a dispersant and 2.0 parts of polyvinyl alcohol as a binder were added based on 100 parts of the calcined ferrite, and granulated into a spherical particle by spray drying with a spray drier (manufactured by Ohkawara Kakohki Co., Ltd.).

The particle size of the obtained particle was adjusted and the particle was then heated at 650° C. for 2 hours using a rotary kiln to remove organic components of the dispersant and the binder.

Step 5 (Firing Step)

In order to control the firing atmosphere, the temperature was raised from room temperature to a temperature of 1300° C. under a nitrogen atmosphere (oxygen concentration: 1.00% by volume) for 2 hours with an electric furnace and then the spherical particles were fired at a temperature of 1150° C. for 4 hours. Thereafter, the temperature was lowered to 60° C. in the electric furnace over 4 hours, the atmosphere was returned to the atmosphere from the nitrogen atmosphere, and the spherical particles were taken out at a temperature of 40° C. or less.

Step 6 (Sorting Step)

After crushing the spherical particles aggregated in the firing step, the low magnetic force product was cut by magnetic separation, and coarse particles were removed by sieving with a sieve having an opening of 250 μm to obtain magnetic core particle 1 having a 50% particle diameter (D50) of 37.0 μm based on volume distribution.

<Preparation of Coating Resin 1>

Cyclohexylmethacrylate monomer: 26.8% by mass
Methyl methacrylate monomer: 0.2% by mass
Methyl methacrylate macromonomer: 8.4% by mass
(macromonomer having a methacryloyl group at one end and a weight average molecular weight of 5000)
Toluene: 31.3 by mass
Methyl ethyl ketone: 31.3% by mass
Azobisisobutyronitrile: 2.0% by mass The above materials were put into a four-necked separable flask equipped with a reflux condenser, a thermometer, a nitrogen introduction tube, and a stirrer. The nitrogen gas was introduced to make a sufficient nitrogen atmosphere, and then the temperature was raised to 80° C.

Thereafter, 2.0% by mass of azobisisobutyronitrile was added, and the mixture was refluxed for 5 hours for polymerization.

Hexane was injected into the obtained reaction product, and the copolymer was precipitated and extracted. The precipitate was separated by filtration and vacuum dried to obtain coating resin 1.

30 parts of the obtained coating resin 1 was dissolved in 40 parts of toluene and 30 parts of methyl ethyl ketone to obtain polymer solution 1 (resin solid content concentration: 30% by mass).

<Preparation of Coating Resin Solution 1>

Polymer solution 1 (resin solid content concentration: 30% by mass): 33.3% by mass
Toluene: 66.4% by mass
Carbon black (Regal 330; manufactured by Cabot Corporation): 0.3% by mass
(primary particle diameter of 25 nm, nitrogen adsorption specific surface area of 94 $m^2/g$, DBP oil absorption amount of 75 ml/100 g)

The above materials were dispersed for 1 hour with a paint shaker using zirconia beads having a diameter of 0.5 mm. The obtained dispersion was filtered through a 5.0 μm membrane filter to obtain coating resin solution 1.

<Production Example of Magnetic Carrier 1>

(Resin Coating Step)

To a vacuum degassed kneader kept at room temperature, the coating resin solution 1 as a resin component was added in an amount of 2.5 parts with respect to 100 parts of the magnetic core particle 1.

After the addition, the mixture was stirred at a rotation speed of 30 rpm for 15 minutes. After the solvent was volatilized to a predetermined level or higher (80% by mass), the product was mixed under reduced pressure while raising the temperature to 80° C., then toluene was distilled over 2 hours, and the mixture was cooled.

From the obtained magnetic carrier, the low magnetic force product was separated by magnetic separation, and passed through a sieve having an opening of 70 μm, and classified with a wind power classifier to obtain magnetic carrier 1 having a 50% particle diameter (D50) of 38.2 μm based on volume distribution.

<Production Example of Two-Component Developer 1>

To 92.0 parts of the magnetic carrier 1, 8.0 parts of the toner 1 was added and mixed using a V type mixer (V-20, manufactured by Seishin Enterprise Co., Ltd.) to obtain two-component developer 1.

<Production Examples of Two-Component Developers 2 to 39 and Comparative Two-Component Developers 1 to 12>

Two-component developers 2 to 39 and Comparative Two-component developers 1 to 12 were obtained by carrying out the same operation as in the production example of the two-component developer 1 except that the toner and the magnetic carrier 1 shown in Table 5 were combined.

TABLE 5

| | | | |
|---|---|---|---|
| Example 1 | Toner 1 | Two-component developer | Toner |
| Example 2 | Toner 2 | Comparative Example 1 | Toner 40 |
| Example 3 | Toner 3 | Comparative Example 2 | Toner 41 |
| Example 4 | Toner 4 | Comparative Example 3 | Toner 42 |
| Example 5 | Toner 5 | Comparative Example 4 | Toner 43 |
| Example 6 | Toner 6 | Comparative Example 5 | Toner 44 |
| Example 7 | Toner 7 | Comparative Example 6 | Toner 45 |
| Example 8 | Toner 8 | Comparative Example 7 | Toner 46 |
| Example 9 | Toner 9 | Comparative Example 8 | Toner 47 |
| Example 10 | Toner 10 | Comparative Example 9 | Toner 48 |
| Example 11 | Toner 11 | Comparative Example 10 | Toner 49 |
| Example 12 | Toner 12 | Comparative Example 11 | Toner 50 |
| Example 13 | Toner 13 | Comparative Example 12 | Toner 51 |
| Example 14 | Toner 14 | | |
| Example 15 | Toner 15 | | |
| Example 16 | Toner 16 | | |
| Example 17 | Toner 17 | | |
| Example 18 | Toner 18 | | |
| Example 19 | Toner 19 | | |
| Example 20 | Toner 20 | | |
| Example 21 | Toner 21 | | |
| Example 22 | Toner 22 | | |
| Example 23 | Toner 23 | | |
| Example 24 | Toner 22 | | |
| Example 25 | Toner 23 | | |
| Example 26 | Toner 24 | | |
| Example 27 | Toner 25 | | |
| Example 28 | Toner 26 | | |
| Example 29 | Toner 27 | | |
| Example 30 | Toner 28 | | |
| Example 31 | Toner 29 | | |
| Example 32 | Toner 30 | | |
| Example 33 | Toner 31 | | |
| Example 34 | Toner 32 | | |
| Example 35 | Toner 33 | | |
| Example 36 | Toner 34 | | |
| Example 37 | Toner 35 | | |
| Example 38 | Toner 36 | | |
| Example 39 | Toner 37 | | |
| Example 40 | Toner 38 | | |
| Example 41 | Toner 39 | | |

As an image forming apparatus, a modified machine of a printer for digital commercial printing (trade name: image RUNNER (registered trademark) ADVANCE C9075 PRO, manufactured by Canon Inc.) was used, and the below-described evaluation was carried out by putting the two-component developer into a developer unit at a cyan position, and adjusting the DC voltage $V_{DC}$ of a developer carrying member, the charging voltage $V_D$ on an electrostatic latent image holding member, and laser power so as to obtain the desired amount of the toner laid on the paper or the electrostatic latent image holding member. The printer was modified to enable free setting of the fixing temperature and process speed.

Test Example 1 [Evaluation of Low Temperature Fixability]

After the DC voltage $V_{DC}$ of the developer carrying member, the charging voltage $V_D$ of the electrostatic latent image holding member, and laser power were adjusted so that the amount of the toner laid on evaluation paper (trade name: CF-C104, A4 paper, basis weight: 104.0 g/m$^2$, manufactured by Canon Marketing Japan Inc.) was 0.90 mg/cm$^2$ in a low temperature and low humidity environment (temperature: 15° C./humidity: 10% RH), the process speed was set to 300 mm/sec, and the fixing temperature was set to 130° C. Under the above conditions, an image of a size of 25 cm$^2$ was printed at the center of the evaluation paper, and the low temperature fixability of the image was evaluated. An image density reduction rate value was used as an evaluation index for low temperature fixability, and the image density reduction rate was measured using an X-Rite color reflection densitometer (500 series: manufactured by X-Rite Co.). First, the image density at the center portion was measured. Then, a load of 4.9 kPa (50 g/cm$^2$) was applied to the portion in which the image density was measured, the fixed image was rubbed (repeated 5 times) with a cleaning paper, and the image density was measured again. Then, the reduction rate (%) in the image density before and after the rubbing was measured. A rank of C or higher was determined to be good. The evaluation results are shown in Table 6.

The evaluation criteria were as follows.

A: The density reduction rate is less than 1.0%.

B: The density reduction rate is 1.0% or more to less than 5.0%.

C: The density reduction rate is 5.0% or more to less than 10.0%.

D: The density reduction rate is 10.0% or more.

Test Example 2 [Evaluation of Hot Offset Resistance of Toner]

Amount of toner laid on paper: 0.60 mg/cm$^2$

The reflectance of the evaluation paper (trade name: CF-C104, A4 paper, basis weight: 104.0 g/m$^2$, manufactured by Canon Marketing Japan Inc.) before imaging was measured using a reflectometer (trade name: REFLECTOMETERMODELTC-6DS, manufactured by Tokyo Denshoku Co., Ltd.), and an average value obtained by measuring the reflectance at 5 places was set to DA (%). At each fixing temperature when the fixing temperature of a fixing unit of the image forming apparatus was changed and image printing was performed such that the amount of the toner laid on the paper reached 0.60 mg/cm$^2$, the reflectance of a portion excluding the image formation portion was measured using the reflectometer, and the maximum value was set to DB (%). Then, the highest fixing temperature at which a difference between DA (%) and DB (%) did not exceed 0.5% was set to an upper fixing temperature. For the upper fixing temperature, the hot offset resistance of the toner was evaluated based on the following criteria. A rank of C or higher was determined to be good. The evaluation results are shown in Table 6.

(Evaluation Criteria)

A: 200° C. or higher

B: 190° C. or higher to lower than 200° C.

C: 180° C. or higher to lower than 190° C.

D: 170° C. or higher to lower than 180° C.

E: Lower than 170° C.

Test Example 3 [Evaluation of Scratch Resistance of Fixed Image]

A halftone image having an image density of 0.20 or more to 0.25 or less was printed on evaluation paper (trade name: OK Top Coat+, basis weight: 127 g/m$^2$, manufactured by Oji Paper Co., Ltd.) and used as an evaluation image. The image density of the evaluation image was measured using a "Macbeth Reflection Densitometer RD918" (manufactured by Gretag Macbeth) in accordance with the attached manual, by measuring the relative density with respect to an image on a white background portion having an image density of 0.00 and taking the obtained relative density as the image density value.

A scratch resistance test was carried out by placing the evaluation paper on the evaluation image, and placing a 500 g weight on the evaluation paper so that the ground contact area was 12.6 cm$^2$, and rubbing the paper 10 times. Thereafter, the toner attached to the paper within a region of 12.6 cm$^2$ (within the region in which the weight was placed) was measured with a fog meter, and the obtained fog value was evaluated based on the following criteria. A rank of D or higher was determined to be good. The evaluation results are shown in Table 6.

(Evaluation Criteria)

A: The fog value is 2% or less.

B: The fog value is 2% or more to less than 5%.

C: The fog value is 5% or more to less than 10%.

D: The fog value is 10% or more to less than 15%

E: The fog value is 15% or more. .

TABLE 6

| | Low temperature fixability | | Hot offset resistance | | Scratch resistance | |
|---|---|---|---|---|---|---|
| | Rank | Density reduction rate [%] | Rank | Fixing condition temperature [° C.] | Rank | Fog value |
| Example 1 | A | 0.3 | A | 200 | A | 1.3 |
| Example 2 | A | 0.3 | A | 200 | A | 1.5 |
| Example 3 | A | 0.3 | B | 198 | A | 1.7 |
| Example 4 | A | 0.3 | B | 198 | A | 1.5 |
| Example 5 | A | 0.3 | B | 197 | A | 1.7 |
| Example 6 | A | 0.5 | B | 190 | B | 2.2 |
| Example 7 | A | 0.5 | B | 193 | A | 1.7 |
| Example 8 | A | 0.5 | B | 194 | A | 1.7 |
| Example 9 | A | 0.5 | B | 196 | A | 1.7 |
| Example 10 | A | 0.3 | B | 199 | A | 1.7 |
| Example 11 | A | 0.3 | B | 197 | A | 1.7 |
| Example 12 | A | 0.3 | B | 195 | A | 1.7 |
| Example 13 | B | 1.0 | B | 195 | A | 1.7 |
| Example 14 | A | 0.5 | B | 195 | A | 1.7 |
| Example 15 | A | 0.5 | B | 195 | A | 1.7 |
| Example 16 | B | 1.0 | B | 195 | A | 1.7 |
| Example 17 | B | 1.4 | B | 194 | A | 1.7 |
| Example 18 | B | 1.4 | B | 194 | A | 1.7 |
| Example 19 | B | 1.7 | B | 193 | A | 1.7 |
| Example 20 | B | 1.7 | B | 192 | A | 1.8 |
| Example 21 | B | 1.7 | B | 191 | B | 2.0 |
| Example 22 | B | 1.7 | B | 190 | B | 2.5 |
| Example 23 | B | 1.7 | C | 189 | B | 2.7 |
| Example 24 | B | 2.0 | C | 183 | B | 3.3 |
| Example 25 | B | 2.0 | C | 183 | B | 3.3 |
| Example 26 | B | 2.5 | C | 182 | B | 3.3 |
| Example 27 | B | 3.1 | C | 182 | B | 3.3 |
| Example 28 | B | 3.1 | C | 182 | B | 3.3 |
| Example 29 | B | 3.1 | C | 182 | B | 4.1 |
| Example 30 | B | 3.1 | C | 182 | B | 3.8 |
| Example 31 | B | 3.1 | C | 182 | B | 3.8 |
| Example 32 | B | 3.1 | C | 182 | B | 4.1 |
| Example 33 | B | 3.1 | C | 180 | B | 4.1 |
| Example 34 | B | 3.1 | C | 181 | B | 4.1 |
| Example 35 | B | 3.1 | C | 181 | B | 4.1 |
| Example 36 | B | 3.1 | D | 180 | B | 4.1 |
| Example 37 | B | 3.1 | D | 177 | B | 4.1 |
| Example 38 | B | 2.5 | D | 178 | B | 4.1 |
| Example 39 | B | 2.0 | D | 179 | B | 4.1 |
| Example 40 | B | 2.0 | D | 177 | B | 4.1 |
| Example 41 | B | 2.0 | D | 177 | B | 4.1 |
| Comparative Example 1 | B | 2.0 | E | 160 | B | 4.1 |
| Comparative Example 2 | B | 3.1 | E | 161 | B | 4.1 |
| Comparative Example 3 | B | 2.5 | E | 162 | B | 4.1 |
| Comparative Example 4 | B | 3.1 | E | 158 | C | 5.3 |
| Comparative Example 5 | B | 2.5 | E | 159 | C | 5.3 |
| Comparative Example 6 | B | 2.0 | E | 160 | B | 4.1 |
| Comparative Example 7 | B | 4.8 | E | 156 | D | 10.1 |
| Comparative Example 8 | B | 4.8 | E | 156 | D | 10.1 |
| Comparative Example 9 | B | 4.8 | E | 154 | D | 12.0 |
| Comparative Example 10 | C | 10.0 | E | 154 | D | 12.0 |
| Comparative Example 11 | D | 13.3 | E | 152 | E | 15.0 |
| Comparative Example 12 | A | 0.3 | E | 170 | B | 4.1 |

As described above, according to the present invention, a toner having both low temperature fixability and hot offset resistance, and having excellent scratch resistance of a fixed image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209734, filed Dec. 17, 2020, which is hereby incorporated by reference herein in its entirety.

What is claimed is:

1. A toner, comprising:

a toner particle containing a binder resin, a crystalline polyester, and a calcium carbonate particle;

the crystalline polyester including a unit derived from an aliphatic diol and a unit derived from an aliphatic dicarboxylic acid, wherein an ester group concentration Ec of the crystalline polyester is 27 to 50% by mass, and Ma is 3 to 40% by mass, and Ma/Mc is 5 to 10 when Ma (% by mass) is a content of the calcium carbonate particle included in the toner particle, and Mc (% by mass) is a content of the crystalline polyester included in the toner particle.

2. The toner according to claim 1, wherein in a cross section of the toner particle, an average value of aspect ratios (major axis/minor axis) of the calcium carbonate particles observed with a transmission electron microscope is 1.5 to 6.0.

3. The toner according to claim 1, wherein a number average particle diameter of the calcium carbonate particle is 100 to 600 nm.

4. The toner according to claim 1, wherein an acid value of the crystalline polyester is 0 to 10 mgKOH/g.

5. The toner according to claim 1, wherein the content Mc is 0.1 to 5.0% by mass.

6. The toner according to claim 1, wherein an abundance A of calcium atoms measured by X-ray photoelectron spectroscopy using the toner as a sample is 0 to 0.5 atomic %.

7. The toner according to claim 1, wherein the ester group concentration Ec is 27 to 40% by mass.

8. The toner according to claim 1, wherein a ratio (Ea/Ec) of an ester group concentration Ea of the binder resin to the ester group concentration Ec is 0.5 to 0.7.

9. The toner according to claim 1, wherein the toner particle includes a graft polymer a having a polyolefin as a trunk and a styrene acrylic resin as a branch.

10. The toner according to claim 9, wherein a ratio (Mo/Mc) of a content Mo (% by mass) of the graft polymer a included in the toner particle to the content Mc is 0.3 to 25, and a ratio (Mo/Ma) of the content Mo to the content Ma is 0.08 to 6 or less.

11. The toner according to claim 1, wherein the toner particle is a pulverized toner particle.

12. A method for producing a toner, comprising:

selecting a toner particle containing a binder resin, a crystalline polyester, and a calcium carbonate particle, the crystalline polyester including a unit derived from an aliphatic diol and a unit derived from an aliphatic dicarboxylic acid, wherein an ester group concentration Ec of the crystalline polyester is 27 to 50% by mass, and Ma is 3 to 40% by mass, and Ma/Mc is 5 to 10 when Ma (% by mass) is a content of the calcium carbonate particle included in the toner particle, and Mc (% by mass) is a content of the crystalline polyester included in the toner particle; and treating a toner particle surface with hot air.

13. The method for producing a toner according to claim 12, wherein a temperature of the hot air is 100 to 450° C.

14. The toner according to claim 1, wherein a content of the binder resin included in the toner particle is 40 to 90% by mass.

* * * * *